US008005108B1

(12) United States Patent
Broad et al.

(10) Patent No.: US 8,005,108 B1
(45) Date of Patent: Aug. 23, 2011

(54) FAST DEPLOYMENT OF MODULES IN ADAPTIVE NETWORK

(75) Inventors: Alan S Broad, Palo Alto, CA (US); Ning Xu, San Jose, CA (US)

(73) Assignee: Memsic Transducer Systems Co., Ltd., Wuxi, Jiangsu Province (CN)

( * ) Notice: Subject to any disclaimer, the term of this patent is extended or adjusted under 35 U.S.C. 154(b) by 892 days.

(21) Appl. No.: 11/930,832

(22) Filed: Oct. 31, 2007

(51) Int. Cl.
*H04J 3/26* (2006.01)

(52) U.S. Cl. .................. 370/432; 340/539.1; 340/10.33

(58) Field of Classification Search ............... 340/539.1, 340/541, 502–505, 517, 2.1, 2.2, 2.21–2.23, 340/3.23, 3.7, 10.33–10.34, 286.02; 370/238, 370/238.1, 310, 254–256, 216, 217, 221, 370/328, 338, 350, 329, 431–433, 337; 455/445
See application file for complete search history.

(56) References Cited

U.S. PATENT DOCUMENTS

| | | | |
|---|---|---|---|
| 4,002,886 | A | 1/1977 | Sundelin |
| 4,418,333 | A | 11/1983 | Schwarzbach et al. |
| 4,766,295 | A | 8/1988 | Davis et al. |
| 5,352,957 | A | 10/1994 | Werner |
| 5,365,154 | A | 11/1994 | Schneider et al. |
| 5,640,151 | A | 6/1997 | Reis et al. |
| 5,697,061 | A | 12/1997 | Krueger et al. |
| 5,841,365 | A | 11/1998 | Rimkus |
| 5,995,015 | A | 11/1999 | DeTemple et al. |
| 6,032,109 | A | 2/2000 | Ritmiller, III |
| 6,078,269 | A | 6/2000 | Markwell et al. |
| 6,208,247 | B1 | 3/2001 | Agre et al. |
| 6,243,654 | B1 | 6/2001 | Johnson et al. |
| 6,381,467 | B1 | 4/2002 | Hill et al. |
| 6,392,562 | B1 | 5/2002 | Boston et al. |
| 6,587,739 | B1 | 7/2003 | Abrams et al. |
| 6,690,289 | B1 | 2/2004 | Odinak et al. |
| 6,745,027 | B2 | 6/2004 | Twitchell, Jr. |
| 6,749,116 | B2 | 6/2004 | Massaro |
| 6,750,769 | B1 | 6/2004 | Smith |

(Continued)

OTHER PUBLICATIONS

"IEEE Standard for a Smart Transducer Interface for Sensors and Actuators—Transducers to Microprocessor Communication Protocols and Transducers Electronic Data Sheet (TEDS) Formats", IEEE Standards 1451.2-1997, IEEE Instrumentation and Measurement Society, 1998, 125 Pages.

(Continued)

*Primary Examiner* — Daniel Wu
*Assistant Examiner* — Nay Tun
(74) *Attorney, Agent, or Firm* — Weingarten, Schurgin, Gagnebin & Lebovici LLP

(57) ABSTRACT

A plurality of modules interact to form an adaptive network in which each module transmits and receives data signals indicative of physical properties sensed at the modules. A new module is joined in the adaptive network in an expedient manner. The new module transmits a burst of beacon messages after the interactive module is activated to discover neighboring interactive modules deployed and operating in the adaptive network. The neighboring interactive module stays in a sleep-mode of low-power expenditure. The beacon messages persist for a first interval longer than a second interval during which the neighboring interactive modules remain in the sleep mode. After receiving the beacon messages, one or more neighboring interactive modules transmit response messages to the new interactive module. The new interactive module receives the response messages and selects a neighboring interactive module for communication based on the received response messages. The new module can also include an indicator for indicating discovery of a neighboring interactive module with which a reliable wireless link can be established.

25 Claims, 6 Drawing Sheets

U.S. PATENT DOCUMENTS

| | | | |
|---|---|---|---|
| 6,822,568 B2 | 11/2004 | Gehlot et al. | |
| 6,844,821 B2 | 1/2005 | Swartzel et al. | |
| 6,859,831 B1 | 2/2005 | Gelvin et al. | |
| 6,961,709 B2 | 11/2005 | Goodwin, III | |
| 6,973,039 B2 * | 12/2005 | Redi et al. | 370/238 |
| 7,035,240 B1 | 4/2006 | Balakrishnan et al. | |
| 7,090,125 B2 | 8/2006 | Goel et al. | |
| 7,103,511 B2 | 9/2006 | Petite | |
| 7,152,040 B1 | 12/2006 | Hawthorne et al. | |
| 7,176,808 B1 | 2/2007 | Broad et al. | |
| 7,231,180 B2 | 6/2007 | Benson et al. | |
| 7,360,095 B2 | 4/2008 | Girouard et al. | |
| 7,369,047 B2 | 5/2008 | Broad et al. | |
| 7,397,368 B2 | 7/2008 | Otto et al. | |
| 7,424,527 B2 | 9/2008 | Petite | |
| 7,429,936 B2 | 9/2008 | Paradiso et al. | |
| 7,440,735 B2 | 10/2008 | Karschnia et al. | |
| 2003/0025599 A1 | 2/2003 | Monroe | |
| 2003/0043028 A1 | 3/2003 | Torikai et al. | |
| 2003/0063585 A1 | 4/2003 | Younis et al. | |
| 2003/0152041 A1 * | 8/2003 | Herrmann et al. | 370/310 |
| 2004/0010492 A1 | 1/2004 | Zhao et al. | |
| 2004/0098218 A1 | 5/2004 | Ito et al. | |
| 2004/0122833 A1 | 6/2004 | Forth et al. | |
| 2004/0233284 A1 | 11/2004 | Lesesky et al. | |
| 2005/0099500 A1 | 5/2005 | Fujita | |
| 2005/0131736 A1 | 6/2005 | Nelson et al. | |
| 2005/0218218 A1 | 10/2005 | Koster | |
| 2005/0237153 A1 | 10/2005 | Chen | |
| 2006/0130142 A1 | 6/2006 | Mester et al. | |
| 2006/0176239 A1 | 8/2006 | Sweeney | |
| 2006/0187040 A1 | 8/2006 | Sweeney | |
| 2006/0220843 A1 * | 10/2006 | Broad et al. | 340/539.23 |
| 2006/0229086 A1 * | 10/2006 | Broad et al. | 455/456.1 |
| 2006/0271667 A1 | 11/2006 | Clow et al. | |
| 2007/0081474 A1 * | 4/2007 | Sasaki | 370/254 |
| 2007/0103271 A1 * | 5/2007 | King et al. | 340/5.72 |
| 2007/0132846 A1 | 6/2007 | Broad et al. | |
| 2007/0291689 A1 | 12/2007 | Kapur et al. | |
| 2008/0310311 A1 * | 12/2008 | Flammer et al. | 370/238 |
| 2009/0021474 A1 * | 1/2009 | Bentley et al. | 345/156 |

OTHER PUBLICATIONS

IEEE Standards for a Smart Transducer Interface for Sensors and Actuators—Mixed-Mode Communication Protocols and Transducer Electronic Data Sheet (TEDS) Formats, IEEE Standards 1451.4-2004, IEEE Instrumentation and Measurement Society, 2004, 439 Pages.

Crossbow Technology, "Xmesh Network Layer," 2006, 1 page.

U.S. Appl. No. 11/152,350, filed Jun. 13, 2005, 33 Pages.

* cited by examiner

FAST DEPLOYMENT OF MODULES IN ADAPTIVE NETWORK

CROSS-REFERENCE TO RELATED APPLICATIONS

This application is related to U.S. patent application Ser. No. 11/433,194 entitled "Adaptive Network and Method," filed on May 11, 2006; U.S. patent application Ser. No. 11/345,737 entitled "Interactive Surveillance-Network and Method," filed on Feb. 1, 2006; U.S. patent application Ser. No. 11/152,350 entitled "Adaptive Surveillance Network and Method," filed on Jun. 13, 2005; and U.S. patent application Ser. No. 11/095,640 entitled "Surveillance System and Method," filed on Mar. 30, 2005, all of which are incorporated by reference herein in their entirety.

BACKGROUND OF THE INVENTION

1. Field of the Invention

This invention relates to a self-adaptive network array of interactive modules that communicate information to local or central computers, more particularly to fast deployment of new interactive modules in the self-adaptive network array of interactive modules.

2. Background of the Invention

An adaptive network such as wireless sensor networks (WSNs) is a network of interactive modules communicating via wireless links that can self-adapt in accordance with changing transmission conditions. The adaptive network has found applications in fields that require deployment of modules over a wide area for a prolonged time, often operating with constrained power sources. In the adaptive wireless networks, the radio range of each individual interactive module is extended by forwarding messages to neighboring interactive modules which in turn relay the messages to other interactive modules. In many adaptive networks, multiple communication paths are used between the interactive modules and a destination to provide redundancy and reliability of the communication.

The adaptive network does not require that a fixed number of interactive modules be used. New interactive modules may be added to an established adaptive network in order to expand or supplement the coverage of the adaptive network. In conventional methods, the new interactive module is added to an established adaptive network by activating the new interactive module at a candidate location. Wireless messages from the added interactive module are transmitted from the candidate location. If the wireless messages are received by the neighboring interactive modules, the messages are relayed to a base station that manages overall operation of the interactive modules. If the messages are not picked up at the base station, the candidate location is deemed unsuitable and the new interactive module is moved to another location to repeat the same process of transmitting the messages and monitoring the messages at the base station. Because multiple hops may be needed before reaching the base station, it may take a prolonged time before confirming whether the candidate location is suitable for deployment of the new interactive module.

Adding new interactive modules to the adaptive network is complicated by the fact that some interactive modules remain in a sleep mode for most of the time to conserve power. The interactive modules in the adaptive network (especially wireless sensor networks) operate on constrained energy sources such as batteries or solar panels. Therefore, to conserve power, the interactive modules become fully operation for a brief wake-up period before reverting to a sleep-mode to conserve power. Such intermittent operation means that the interactive modules already deployed in the adaptive network may not be always available to receive and relay the messages from the newly deployed interactive modules to the base station. Moreover, when one or more hops between already deployed interactive modules are needed, each interactive module must wait for the next interactive module to wake up before relaying the messages to the next interactive module. Therefore, the sleep mode of the interactive modules causes further delays and inconveniences in the deployment of new interactive modules.

SUMMARY OF THE INVENTION

In accordance with one embodiment of the present invention, a new interactive module to be joined in an adaptive network transmits a burst of beacon messages after the interactive module is activated to discover neighboring interactive modules deployed and operating in the adaptive network. The neighboring interactive module may intermittently wake up from a sleep mode of low-power expenditure to perform its operations. The beacon messages persist for an interval longer than the interval during which the neighboring interactive modules remain in the sleep mode. After receiving the beacon messages, the neighboring interactive modules transmit response messages to the new interactive module. The new interactive module receives the response messages and selects a neighboring interactive module via which to communicate based on the received response messages. After selecting the neighboring module, the newly joined interactive module sends information to the destination via the selected neighboring module.

In one embodiment, each beacon message includes a preamble and data subsequent to the preamble. The preamble persists at least for the interval during which the neighboring interactive modules remain in the sleep mode. The data in the beacon message may indicate the number of the beacon messages in the burst of the beacon messages (e.g., four beacon messages) and the sequence of the beacon message within the burst of the beacon messages (e.g., the second beacon message of the four beacon messages). The neighboring interactive module may determine the reliability and strength of the wireless link from the newly joined interactive module to the neighboring interactive module based on the beacon messages received.

In one embodiment, the newly joined interactive module selects neighboring interactive module via which to communicate based on some or all of the following factors: (i) a percentage of the beacon messages received at the neighboring interactive modules, (ii) a percentage of the response messages receive at the new interactive module, (iii) a received signal strength indicator (RSSI) at the neighboring interactive modules determined from the beacon messages receive at the neighboring interactive modules, (iv) a received signal strength indicator (RSSI) at the interactive modules determined from the response messages received at the new interactive module, (v) a link quality indicator (LQI) at the neighboring interactive modules determined from the beacon messages received at the neighboring interactive modules, (vi) a link quality indicator (LQI) at the interactive module determined from the response messages received at the new interactive module, (vii) cost (energy) for transmitting a message from the interactive module to a destination via the neighboring interactive modules, and (viii) hops between the neighboring interactive modules and the destination.

In one embodiment, the new interactive module to be joined in the adaptive network has an indicator for indicating the presence and the number of neighboring interactive modules with which reliable wireless links can be established. The indicator may be is a tri-color light emitting diode (LED) displaying a first color (e.g., red) indicating discovery of no neighboring interactive module with which a reliable wireless link can be established, a second color (e.g., yellow) indicating discovery of one neighboring interactive module with which a reliable wireless link can be established, and a third color (e.g., green) indicating discovery of two or more neighboring interactive modules with which reliable wireless links can be established.

In one embodiment, the beacon messages transmitted by the newly joining interactive module are not relayed to the destination. If the neighboring interactive modules determine that the message received is the beacon messages, the neighboring interactive module generates metric information based on the received beacon messages and transmits the response messages including the metric information to the interactive module only.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

Embodiments disclosed can be readily understood by considering the following detailed description in conjunction with the accompanying drawings.

DETAILED DESCRIPTION OF THE INVENTION

For the sake of explanation, adaptive networks and interactive modules are described hereinafter using examples and embodiments of a surveillance system. The adaptive networks and the interactive modules described herein are merely illustrative; other types of interactive modules may be used to form the same or different adaptive networks. For example, the interactive modules may be deployed in a farm to detect humidity or temperature at different locations of the farm. Also, the interactive modules may be deployed in an industrial plant or factory to detect temperature and other physical properties at different locations of the plant or factory. The interactive modules and the adaptive networks may be modified for such different applications.

Example Structure of Interactive Module and Adaptive Network

Figure 1:
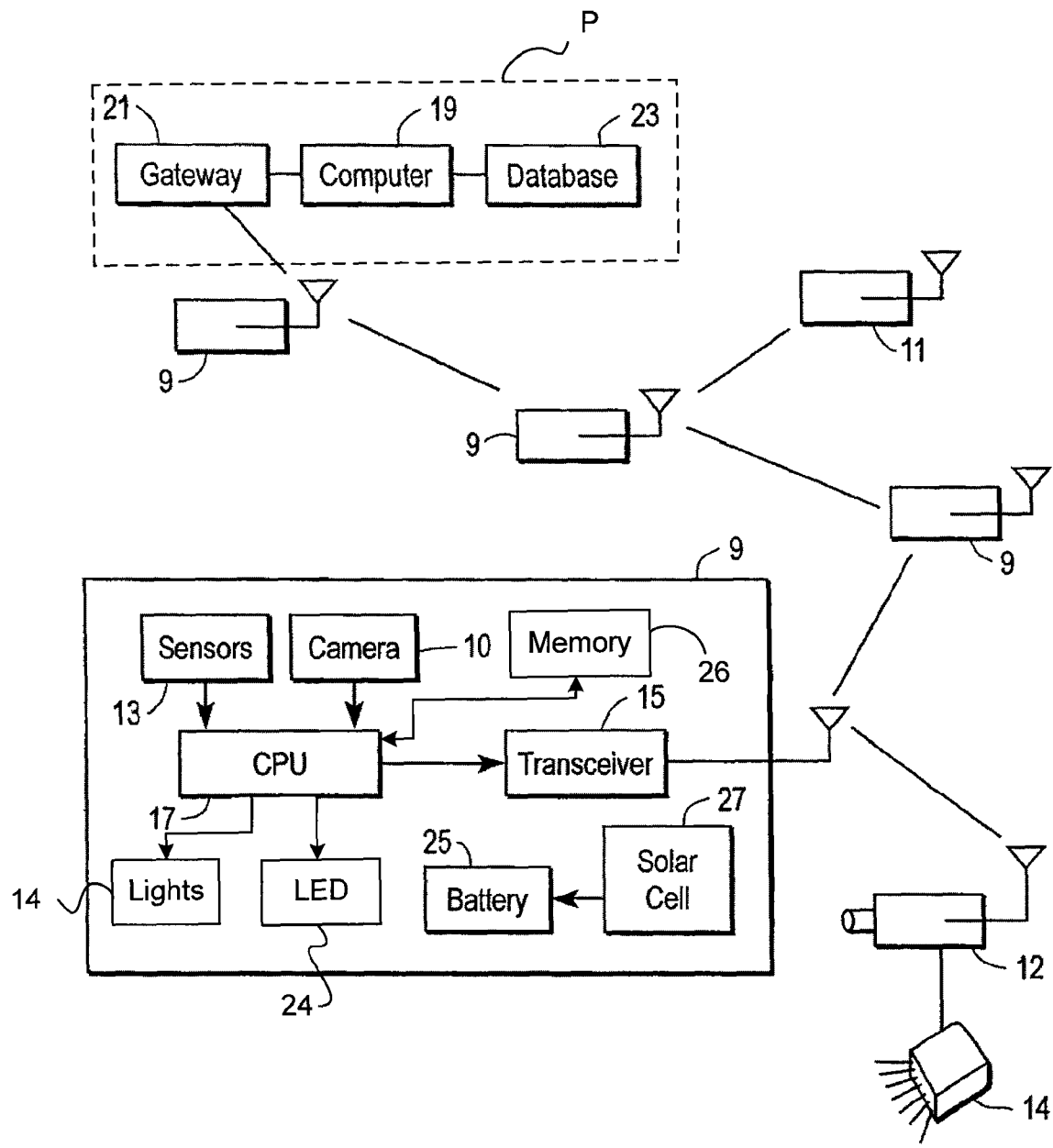
FIG. 1 illustrates a block diagram of interactive modules and an adaptive network including the interactive modules, in accordance with one embodiment of the present invention.

FIG. 1 illustrates a plurality of interactive module (i.e., sensor modules) deployed at spaced locations, for example, along a peripheral boundary of an area to be secured. Additional sensor modules 11 may be deployed along pathways or entryways or other locations within the area to be secured in order to monitor traffic or other activities.

Each sensor module 9, 11 includes, among other components, a processor 17, a sensor 13, a camera 10, memory 26, a transceiver 15, lights 14, a light emitting diode (LED) 24, a solar cell 27, and a battery 25. The sensor 13 may be, for example, a passive infrared sensor that responds to the presence or proximity of a warm object such as an individual, vehicle, or the like. Alternatively, the sensor 13 may be an active infrared or radio or ultrasonic sensor that emits a signal and senses any echo attributable to presence of a reflective object within a sensing field of view. Other sensors such as vibration detectors or light detectors may also be used to respond to the presence of an intruding object.

In addition, the transceiver 15 responds to radio transmissions from other similar modules, and also transmits radio signals to other modules for reception and relay or re-transmission thereby of such received signals. In this way, an array of modules 9, 11 forms an interactive, distributed network that operates self-adaptively on operative modules 9. Thus, if one module 9, 11 is added, removed or is rendered inoperative, then adjacent operative modules 9, 11 are capable of interacting to reconfigure a different distributed array.

The processor 17 controls operation of the transceiver 15 and the sensor 13 to produce data signals for transmission via the transceiver 15 to a destination (e.g., a base station) via one or more adjacent modules 9, 11. In addition, the processor 17 may control random recurrences of monitoring events to amass information about any changes in circumstances associated with proximate objects, for conversion to data signals to be transmitted via the transceiver 15.

The memory 26 stores instructions to be read and executed by the processor 17. The memory 26 may be various types of computer readable storage medium such as flash memory, programmable read-only memory (ROM), erasable programmable read-only memory (EPROM), mask-programmed ROM, programmable ROM, UV-erase EPROM, electrically erasable PROM (EEPROM), and random access memory (RAM). The memory 26 may also store information generated by the module 9 and messages received from one module for relay to another module.

In one embodiment, the LED 24 receives commands from the processor 17 to indicate the presence of neighboring modules with which reliable wireless links can be established. When deploying the module 9, the processor 17 discovers other neighboring modules, as described below in detail with reference to FIGS. 5 to 7. The processor 17 determines the number of neighboring modules with which the module 9 can communicate reliably, and commands the LED 24 to display colors accordingly. For example, if there is no neighboring module with which reliable communication can be established, a first color (e.g., red) is displayed on the LED 24. If there is only one neighboring module with which reliable communication can be established, a second color (e.g., yellow) is displayed. If there are two or more neighboring module with which reliable communication can be established, a third color (e.g., green) is displayed on the LED 24. By indicating on the module 9 the presence and the number of the neighboring module with which the module 9 can communicate reliably, a person deploying the module 9 can determine on-site whether the module 9 is being placed at a suitable location without monitoring signals at a base station P.

In another embodiment, the LED 24 is replaced by other indicators such as a beeper or buzzer to indicate the number of neighboring modules with which the module 9 can communicate reliably. The beeper of buzzer may make different sounds depending on the presence and the number of the neighboring module with which the module 9 can communicate reliably.

The base station P includes, among other elements, a gateway 21, a computer 19 and a database 23. The computer 19 may operate on a database 23 of address or identification code for each module 9, 11, 12 in order to communicate through the network of modules 9, 11 each having different addresses or identification codes, to a particular module having a selected address. In this way, each module 9, 11, 12 may transmit and receive data signals specifically designating the module by its unique identification code or address. The gateway 21 includes a wireless transceiver for communicating with a module 9 located near the base station P. The gateway 21 is coupled to the computer to send and receive wireless messages to and from the module in accordance with commands from the computer 19.

The module 9 communicates with other neighboring modules via the transceiver 15. The messages transmitted from the transceiver 15 of the module 9 may be relayed to the base station P via other modules 9, 11. The module 9 may receive messages from other modules and relay the messages to the base station P (if module 9 is coupled to the base station P) or to another module (if module 9 is not coupled to the base station P) to forward the message to the base station P.

In one embodiment, the modules 9, 11, 12 are powered by constrained power sources such as self-contained batteries 25 and/or photovoltaic cells 27 that charge the batteries 25. In order to extend the time of operation using the constrained power sources, the modules 9, 11, 12 is in a sleep mode during most of the time and intermittently wake up from the sleep mode. In the sleep mode, only limited functions of the modules 9, 11, 12 are operational, thereby conserving the power available from the constrained power sources.

Initialization of Adaptive Network

Figure 2:
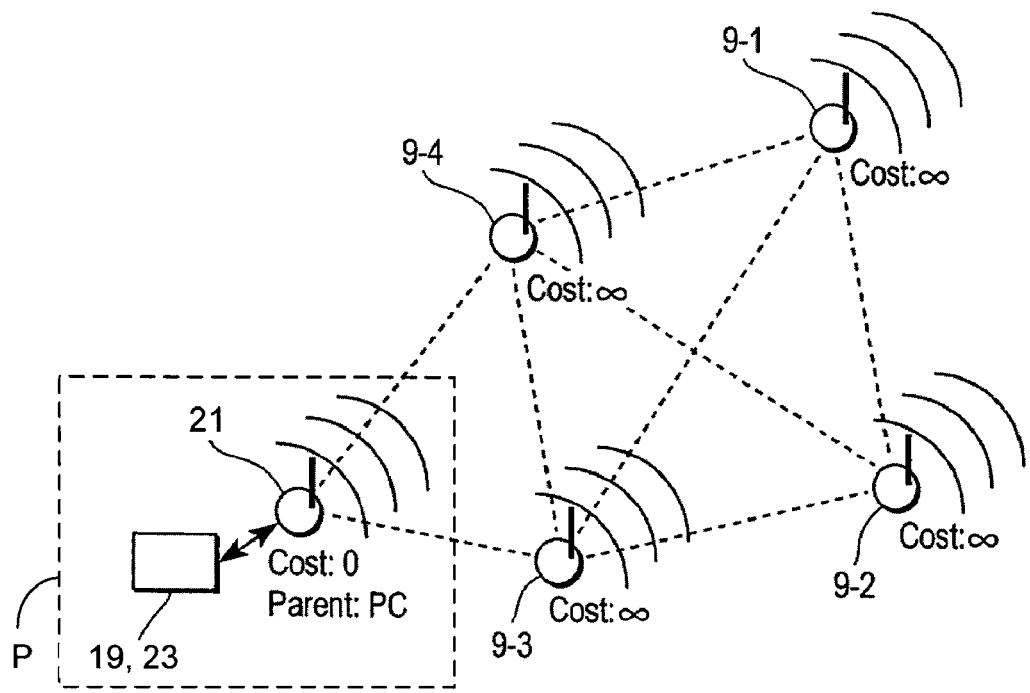
FIG. 2 illustrates an array of spaced interactive modules upon initialization of an adaptive network.

Referring to FIG. 2, an adaptive network is illustrated to describe 'cost' as a value or number indicative of the amount of energy required to transmit a message to another receiving module. Higher cost translates, for example, into higher energy consumption from limited battery capacity in each module. In order for an adaptive network to form, a module (9-1 to 9-4) must select a parent or superior module to which to forward messages. The radio transmissions or beacons from neighboring modules inform a module about how well the neighboring modules can receive its messages which include cost for the neighboring modules to forward a message toward a base station, together with a 'hop' count (i.e., number of repeater or message relay operations) to such base station. This may not be enough information by which a module as a subordinate module can select a parent or superior module since a radio link may be highly asymmetrical on such two-way communications. Thus, a neighboring module may receive clearly from a module but that module may not receive clearly from the neighboring module. Selecting such neighboring module as a parent would result in a poor wireless link resulting in many message repeats and acknowledgements at concomitant cost.

However, such a module (9-1 to 9-4) can also 'overhear' transmissions of neighboring modules that include the neighboring modules' neighborhood list (NL) as a pre-set maximum number (e.g., sixteen (16)) of modules from which the neighboring module can receive. For greater numbers of modules, the neighboring module excludes from the NL those modules with poor or lower-quality reception. Thus, if a receiving module does not detect its broadcast address or ID in a potential parent's NL, then that neighboring module will not be selected as a parent. A base station P may be set to accommodate a larger number of modules in its NL to handle more children or subordinate modules for greater prospects of assembling an efficient adaptive network through some selection of modules and relay operations therebetween.

Transmitted messages from a module (9-1 to 9-4) contain data representing several factors including, among others, the following:

a) cost, as a number to be minimized which indicates to neighboring modules the amount of energy required to transmit to a base station. The cost is a summation of all costs of all 'hops' to the base station (a base station P has zero cost to forward messages, so its messages are distinctive from messages of possible parent modules);

b) the number of 'hops' to send a message to the base station P;

c) a packet sequence number (e.g., 16-bit integer) that is incremented every time a message is transmitted from the base station P or other module 9-1 to 9-4; and d) a neighborhood list (NL) of all other modules in the vicinity from which the base station or other module can receive, including:
  i) the ID of each neighboring modules; and
  ii) a reception estimate of how well a module receives messages from such neighboring module as determined from processing the sequence numbers in such message packets to compute a percent of lost packets.

Therefore, a module (9-1 to 9-4) may calculate a probability factor (PF) of success in transmitting to a possible parent, as:

$$PF = (\% \text{ of module's packets received by neighboring module}) \times (\% \text{ of possible parent's packets received by module}).$$

Each module (9-1 to 9-4) may thus calculate its own cost (OC) of sending a message to the base station P, as:

$$OC = (\text{cost of neighboring module})/PF.$$

In one embodiment, a module selects a neighboring module with lowest OC to send a message.

As illustrated in FIG. 2, initialization of the network is facilitated by the base station P broadcasting a message including zero costs. In contrast, messages broadcast by all other modules (9-1 to 9-4) initially include infinite cost (since not yet determined how to route messages to the base station). And, there are no entries in the NL in initial broadcast messages. Data messages from a module are sent with a broadcast address since no parent has been selected. Modules (e.g., 9-3 and 9-4) that can receive base station messages from gateway 21 containing zero cost information will recognize that they can forward messages to such base station. Then, messages forwarded by modules 9-3 and 9-4 within the reception vicinity of the base station P enable the base station to assemble and include within their messages a NL of modules (including modules 9-3 and 9-4) that receive the base station messages. And, these modules then include the base station and other neighboring modules in their NL within broadcast messages. A parent (e.g., module 9-4) is then selected as a superior module by other modules as subordinate module whose messages each change from a broadcast address to the parent's address. The network formation thus propagates across the array to more remote modules (e.g., modules 9-1 and 9-2) that are not in the reception vicinity of the base station P.

Figure 3:
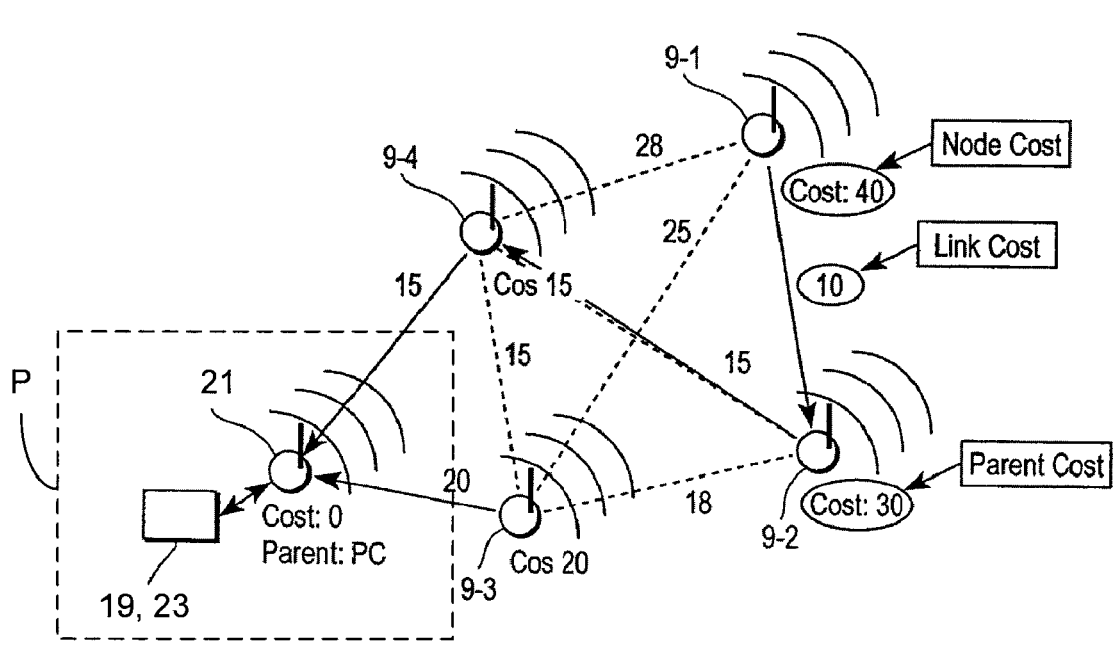
FIG. 3 illustrates the array of FIG. 2 following formation of wireless links between the interactive modules in the adaptive network.

Thus, as illustrated in FIG. 3, each module (e.g., module 9-1) may calculate a node cost as the parent's cost plus the cost of the link to the parent (e.g., 9-2). Similarly, each wireless link toward the base station P will be selected by lowest cost (e.g., via module 9-4 rather than via module 9-3) as the network adapts to the existing transmission conditions. In the event the cost parameters change due, for example, to addition or re-location or inoperativeness of a module, then a transmission path to the base station for a remote module will be selected on such lower cost (e.g., from module 9-2 via module 9-3, or from module 9-1 via module 9-4 or 9-3), and such replaced module will be identified by the absence of its address in successive transmission by other, adjacent modules or in failure of response to a polling command from the base station P.

Figure 4:
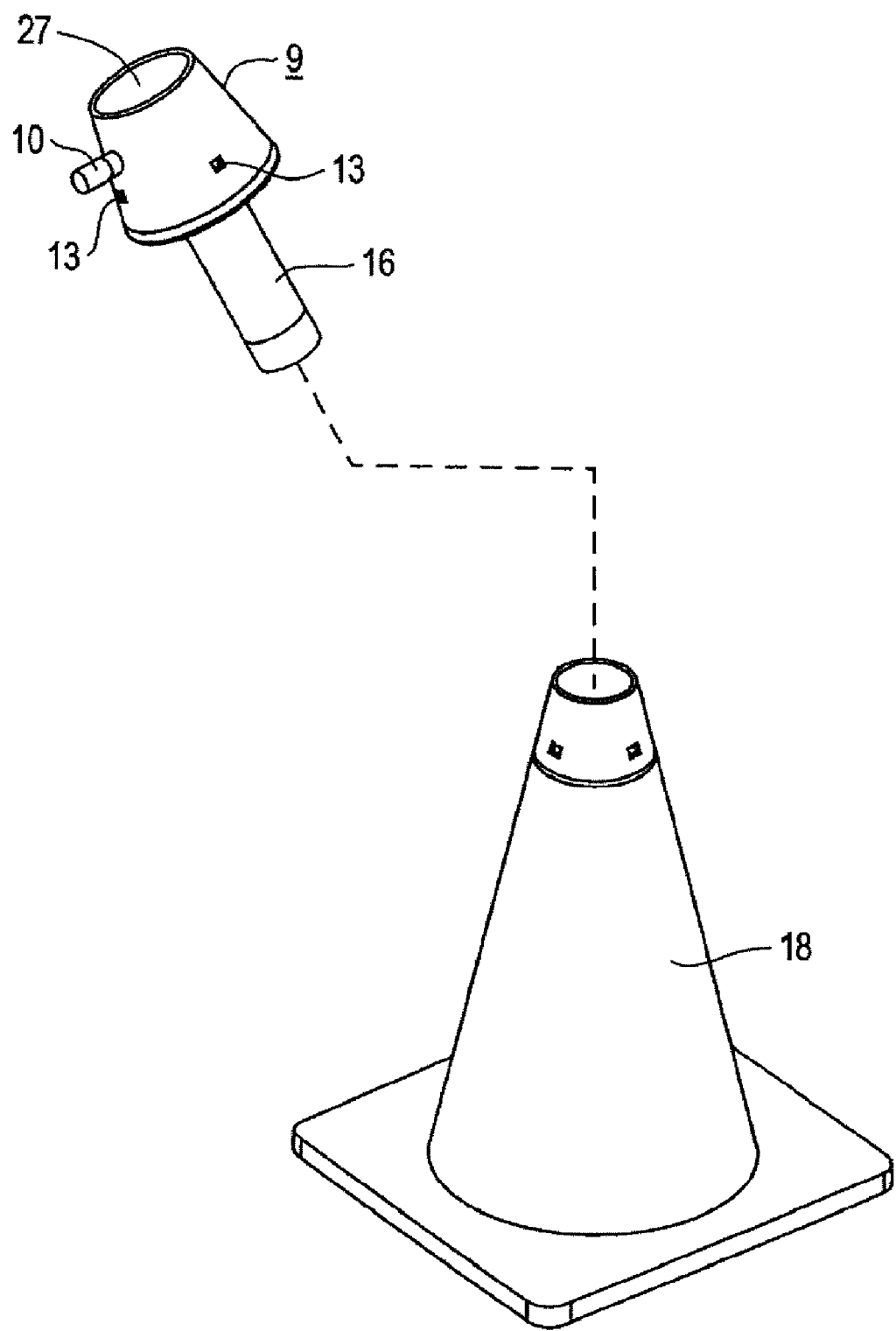
FIG. 4 illustrates an exploded view of an example interactive module.

Referring now to FIG. 4, there is illustrated a pictorial exploded view of an interactive module 9. Specifically, the module 9 may be configured in one embodiment as a truncated cone with a descending attached housing 16 that is suitably configured for containing batteries 25. The top or truncation may support photovoltaic or solar cells 27 that are connected to charge batteries 25. The module 9 conforms generally to the conical shape of a conventional highway marker 18 and is dimensioned to fit into the top or truncation of the highway market 18 as one form of support. Such cones may be conveniently stacked for storage. The module 9 may be suitably packaged differently, for example, as a top knob for positioning on a fence post, or the like.

The module 9 includes one or more sensors 13 such as infrared detectors equipped with wide-angle lenses and disposed at different angular orientations about the periphery of the module 9 to establish overlapping fields of view. One or more cameras 10 may also be housed in the module 9 to include azimuth, elevation and focus operations under control of the processor 17 in a conventional manner.

The module 9 may detect the transient presence of an object. Such detection may be by one or more of passive infrared or acoustic or magnetic sensing, or by active transmission and reception of transmitted and reflected energy. The processor 17 in each module 9, 11 controls operation of the sensor 13 of that module in order to generate data signals for transmission to adjacent modules. The processor 17 may establish sensing intervals independently, or in response to transmission thereto (via designated address or identification code) of commands from the central computer 19.

In another example, the network assembled in a manner as previously described herein operates in time synchronized mode to conserve battery power. In this operating mode, the control station (e.g., computer 19) periodically broadcasts a reference time to all modules 9, 11, 12 in the network, either directly to proximate modules or via reception and re-broadcasts through proximate modules to more remote modules. Modules may correct for propagation delays through the assembly network, for example, via correlation with accumulated cost numbers as previously described herein.

Once all modules 9, 11, 12 are operable in time synchronism, they reduce operating power drain by entering low-power mode to operate the transceivers 15 only at selected intervals (for example, every 125-500 milliseconds). In this wake-up interval of few milliseconds duration, each transceiver transmits and/or receives broadcast data messages (in the absence of an intrusion anywhere), for example, of the type previously described to assess continuity of the assembled network, or to re-establish communications in the absence or failure of a module 9, 11, 12 previously assembled within the network.

Joining of New Interactive Modules

In one embodiment of the present invention, a module joining the adaptive network (hereinafter referred to as "new module") transmits a burst of beacon messages to discover neighboring modules that are already part of an adaptive network. One or more neighboring modules send response messages in response to the beacon messages. The new module selects which neighboring module to communicate with based on the received response messages.

Each beacon message persists for a time longer than the time the neighboring modules of the established adaptive network remains in a sleep mode. In the sleep mode, the modules of the established adaptive network maintain low energy consumption by deactivating most of the functions including listening to radio signal transmitted by other modules. Because the beacon messages of the new persist longer than the period during which the other neighboring modules remain in the sleep mode, the neighboring modules of the adaptive network receives the beacon messages from the new module after waking up from the sleep mode.

Figure 5:
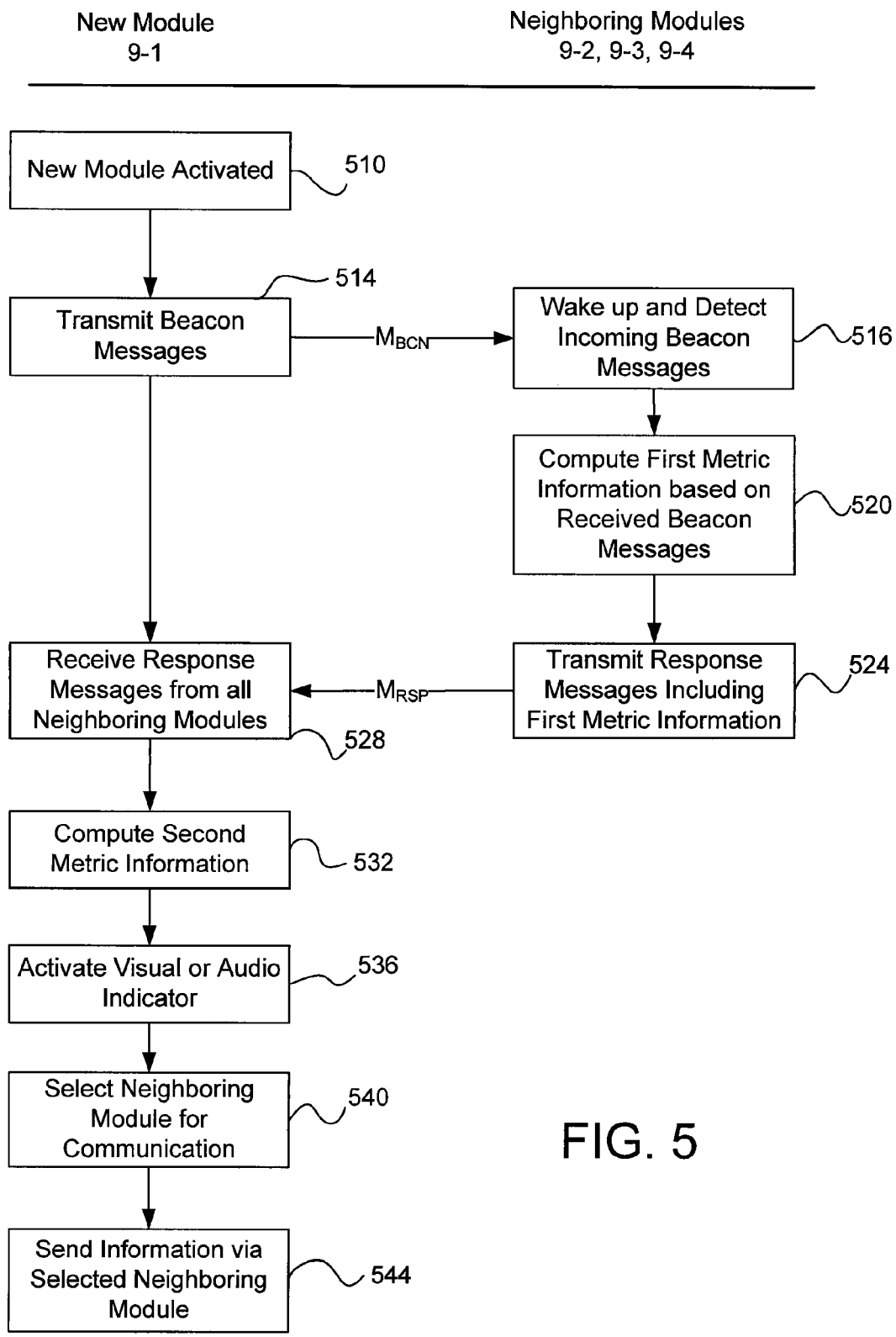
FIG. 5 illustrates a flowchart for deploying a new interactive module, according to one embodiment of the present invention.

Referring to FIG. 2, a new module 9-1 is activated to join an established adaptive network consisting of a base station P and neighboring modules 9-2, 9-3, 9-4. FIG. 5 illustrates a flowchart of the method for joining the new module 9-1 in the adaptive network, according to one embodiment of the present invention. First, the new module 9-1 is activated 510 for deployment. After the module 9-1 is activated, the transceiver 15 of the module 9-1 transmits 514 a burst of beacon messages $M_{BCN}$. The burst of beacon messages may include two or more beacon messages $M_{BCN}$, each beacon message $M_{BCN}$ persisting longer than the time neighboring modules 9-2, 9-3, 9-4 are in the sleep mode, as described below in detail with reference to FIG. 6. After the neighboring modules 9-2, 9-3, 9-4 wake up, the neighboring modules 9-2, 9-3, 9-4 detect 516 the beacon messages $M_{BCN}$ transmitted by the new module 9-1.

In one embodiment, the beacon message $M_{BCN}$ includes a preamble that persists longer than the time the neighboring modules 9-2, 9-3, 9-4 stay in the sleep mode. The preamble is followed by data including information regarding the beacon message $M_{BCN}$, as described in detail below with reference to FIG. 6. In another embodiment, the beacon message $M_{BCN}$ may have no preamble or a short preamble. In this embodiment, the data including information regarding the beacon message $M_{BCN}$ may be repeated for a time longer than interval $T_{S1}$ during which the neighboring modules 9-2, 9-3, 9-4 remain in the sleep mode.

After the one or more neighboring modules 9-2, 9-3, 9-4 receive the burst of beacon messages $M_{BCN}$ from the new module 9-1, the one or more neighboring modules 9-2, 9-3, 9-4 compute 520 first metric information based on the receive beacon messages $M_{BCN}$. In one embodiment, the first metric information includes all or some of the following metrics (i) to (v):

(i) A percentage of the beacon messages $M_{BCN}$ successfully received from the new module 9-1. Each beacon message includes data indicating the number of beacon messages transmitted in the burst of beacon messages and the sequence of the beacon message within the burst of the beacon messages, as described below in detail with reference to FIG. 6. Therefore, the one or more neighboring modules 9-2, 9-3, 9-4 may compute the percentage of the beacon messages $M_{BCN}$ received based on the data included in the beacon messages $M_{BCN}$.

(ii) Received radio signal strength (RSSI) of certain beacon messages $M_{BCN}$ or average RSSI of all of the beacon messages $M_{BCN}$ included in the burst of the beacon messages.

(iii) A link quality indicator (LQI) of certain beacon messages $M_{BCN}$ or average LQI of all the beacon messages $M_{BCN}$ included in the burst. The LQI represents how well spread spectrum correlators can match the bit patterns of the incoming beacon signals $M_{BCN}$.

(iv) A cost as a value or number indicative of the amount of energy required to transmit a message to another receiving module, as described above in detail with reference to FIG. 2.

(v) Hops indicative of the number of forwarding transmissions from the modules necessary before the message reaches the destination (e.g., the base station P), as described above in detail with reference to FIG. 2.

After calculating the metrics, the one or more neighboring modules 9-2, 9-3, 9-4 transmit 524 response messages $M_{RSP}$ to the new module 9-1. Each response message $M_{RSP}$ includes the first metric information as computed by the neighboring module 9-2, 9-3, 9-4 transmitting the response message $M_{RSP}$. Each neighboring module 9-2, 9-3, 9-4 may transmit a single response message $M_{RSP}$ in response to a burst of the beacon messages $M_{BNC}$. Alternatively, each neighboring module 9-2, 9-3, 9-4 may transmit a burst of identical response messages $M_{RSP}$, as described below in detail with reference to FIG. 9.

The new module 9-1 then receives 528 the response messages $M_{RSP}$ from all of the modules 9-2, 9-3, 9-4. The new module computes 532 second metric information based on the received response messages $M_{RSP}$. The second metric information may be all or some of the following metrics: (i) a percentage of messages received from the modules 9-2, 9-3, 9-4; (ii) RSSI of a response message $M_{RSP}$ or average RSSI of the response messages $M_{RSP}$ over multiple response messages; and (iii) LQI of a certain response message $M_{RSP}$ or average LQI of the multiple response messages $M_{RSP}$. These metrics are merely illustrative and different metrics may be used instead.

Based on the first and second metric information, the new module 9-1 determines the number of the modules with which the new module 9-1 may communicate reliably. Then the new module 9-1 activates 536 an indicator (e.g., LED 24) to indicate the number of modules available for reliable communication at current location, as described above in detail with reference to FIG. 1. Therefore, a person deploying the new module 9-1 can easily determine whether the current location is suitable for deployment of the new module 9-1 by monitoring the indicator.

The new module 9-1 also selects 540 a neighboring module 9-2, 9-3, 9-4 for communicating based on the first and second metric information. In one embodiment, the new module 9-1 selects a neighboring module with the best bidirectional wireless link for communication among the neighboring module available for communication. This means that both the new module 9-1 and the neighboring module 9-2, 9-3, 9-4 receives all or most of each other's transmission. The best bidirectional wireless link is characterized by (i) a high LQI in both the first metric information and the second metric information, (ii) a high RSSI both the first metric information and the second metric information, and (iii) high percentages of the beacon messages $M_{BCN}$ and the response messages $M_{RSP}$ received. In one embodiment, the new module 9-1 selects a neighboring module 9-2, 9-3, 9-4 having the highest LQI or RSSI if the percentages of the beacon messages $M_{BCN}$ or the response messages $M_{RSP}$ received exceeds a threshold (for example, 75%).

In another embodiment, the new module 9-1 selects the neighboring module 9-2, 9-3, 9-4 having the lowest cost or the minimum number of hops for communication. In still another embodiment, the new module 9-1 may score these factors and select the neighboring modules 9-2, 9-3, 9-4 with the best score. These factors and criteria for selecting the neighboring modules 9-2, 9-3, 9-4 are merely illustrative, and different factors and criteria may be used.

After the neighboring module is selected for communication by the new module 9-1, the new module 9-1 generates information using transducers such as the sensors 13 and the camera 10. Alternatively, the new module 9-1 receives information from other neighboring modules 9-2, 9-3, 9-4 for relay to a destination. The new module 9-1 then sends (or relays) 544 the information to the destination (e.g., the base station P) via the selected neighboring module.

In one embodiment, the one or more neighboring modules 9-2, 9-3, 9-4 do not relay the beacon messages $M_{BCN}$ to the base station P or other modules in the adaptive network. By not relaying the beacon messages $M_{BCN}$ to the base station P or other modules, the power of the modules may be conserved by reducing the number of transmissions from the neighboring modules 9-2, 9-3, 9-4. The response messages $M_{RSP}$ also includes data (e.g., data associated with the cost or hops) indicating whether the neighboring modules 9-2, 9-3, 9-4 can effectively communicate with the base station P.

Figure 6:
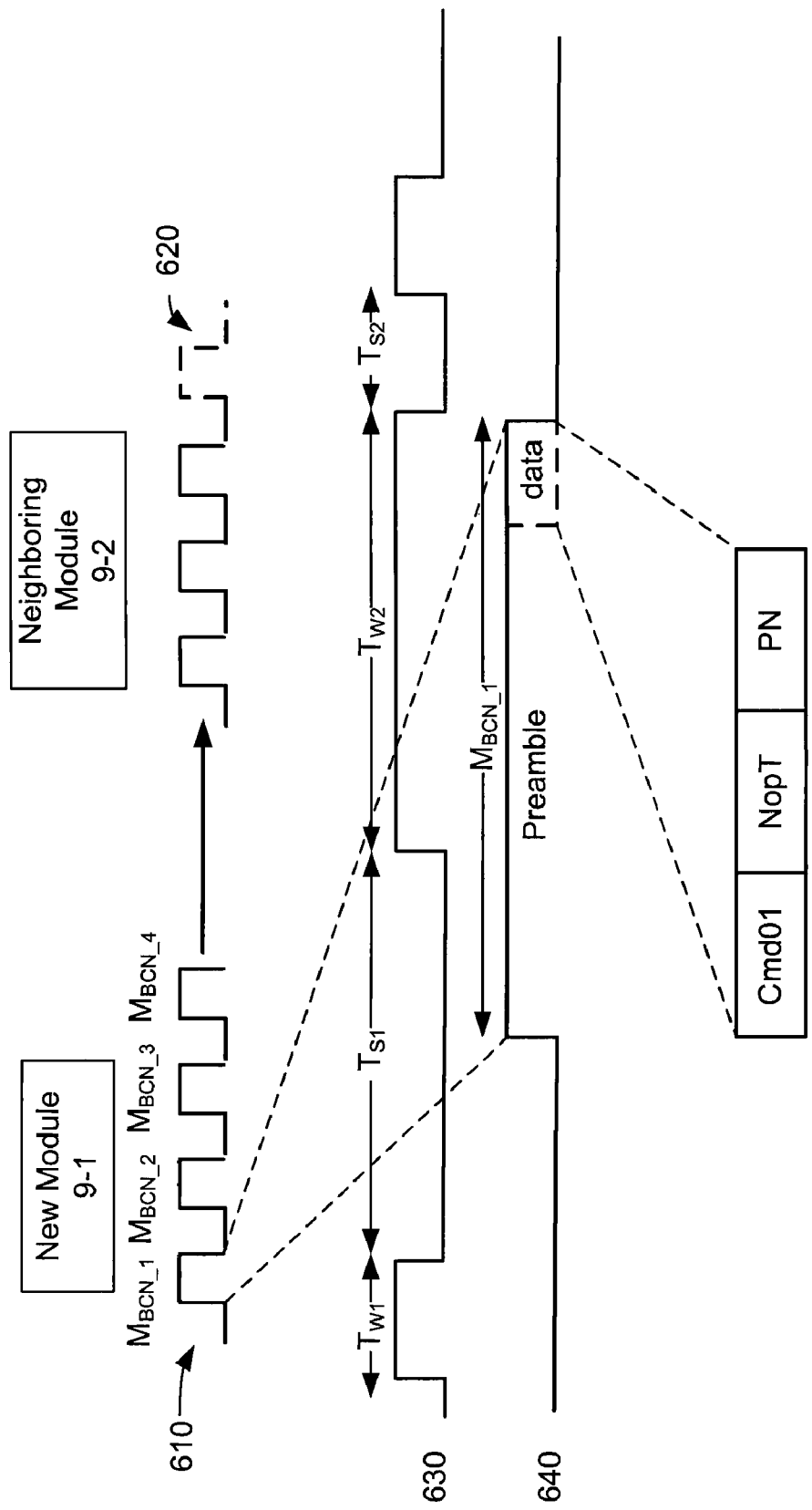
FIG. 6 illustrates a burst of beacon messages sent by a new interactive module to be joined in the adaptive network, according to one embodiment of the present invention.

FIG. 6 illustrates a burst of beacon messages $M_{BCN1}$, $M_{BCN2}$, $M_{BCN3}$, $M_{BCN4}$ sent by a new module 9-1 after activation for deployment, according to one embodiment of the present invention. Line 610 represents the beacon messages $M_{BCN1}$, $M_{BCN2}$, $M_{BCN3}$, $M_{BCN4}$ transmitted by the new module 9-1 and line 620 represents the beacon messages received at the neighboring module 9-2 (lines 610 and 620 are not for scale with lines 630 and 640). In the example of FIG. 6, the neighboring module 9-2 receives only the first three beacon messages $M_{BCN1}$, $M_{BCN2}$, $M_{BCN3}$, but not the last beacon message $M_{BCN4}$. Therefore, the percentage of beacon messages received by the neighboring module 9-2 is 75%.

As illustrated by line 630 in FIG. 6, the neighboring modules 9-2, 9-3, 9-4 wake up during intervals $T_{W1}$ and $T_{W2}$ but stays in the sleep mode during intervals $T_{S1}$ and $T_{S2}$. Each beacon message $M_{BCN1}$, $M_{BCN2}$, $M_{BCN3}$, $M_{BCN4}$ persists for a time longer than the interval $T_{S1}$ during which the neighboring modules 9-2, 9-3, 9-4 remain in the sleep mode. Therefore, upon wake up, the neighboring modules 9-2, 9-3, 9-4 receives the beacon message $M_{BCN1}$ from the new module 9-1. The neighboring modules 9-2, 9-3, 9-4 may extend the wake-up time ($T_{W2}$) so that the entire beacon message $M_{BCN1}$ is received. The neighboring modules 9-2, 9-3, 9-4 determine from the data of the beacon messages that all of the beacon messages $M_{BCN1}$, $M_{BCN2}$, $M_{BCN3}$, $M_{BCN4}$ in the burst of the beacon messages are received. After all of the beacon messages are received, the neighboring modules 9-2, 9-3, 9-4 transmit the response messages $M_{RSP}$.

In one embodiment, the neighboring modules 9-2, 9-3, 9-4 revert to the sleep mode and remains in the sleep mode after one beacon message is received (for example, $M_{BCN1}$) until the next beacon message (for example, $M_{BCN2}$) is expected. In another embodiment, the neighboring modules 9-2, 9-3, 9-4 stays in wake-up mode until all of the beacon signals in the burst of beacon signals are received In the example of FIG. 6, the data in the beacon message $M_{BCN1}$ includes, among other fields, the following three data fields: (i) Cmd01 field indicating that this message is part of transmitted burst of beacon messages, (ii) NopT field indicating the total number of data packets in the transmitted burst of beacon messages, and (iii) PN field indicating the sequence of the message within the burst of the beacon messages. The neighboring module 9-2, 9-3, 9-4 may determine from the data in the beacon message that the message received is a beacon message, how many beacon messages are being transmitted in the burst, how many beacon messages the neighboring module 9-2, 9-3, 9-4 failed to receive, and the percentage of the beacon messages successfully received.

Figure 7:
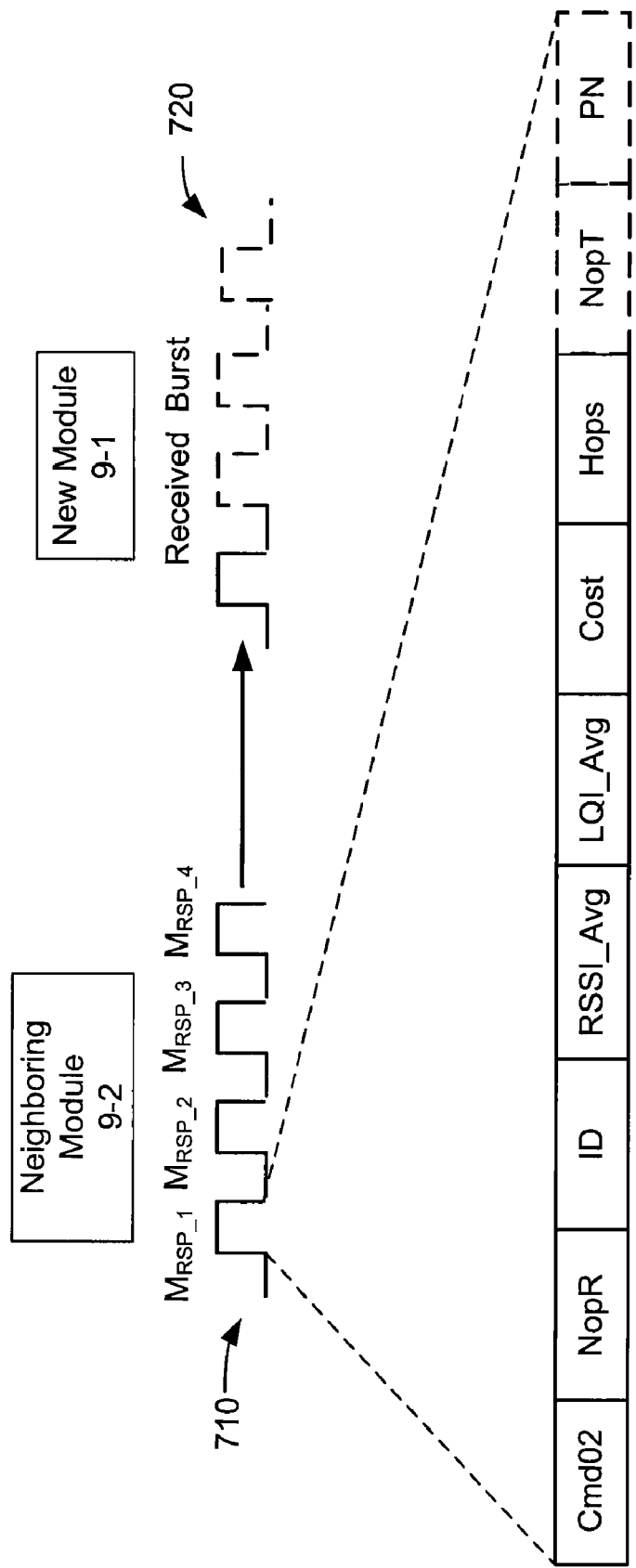
FIG. 7 illustrates a burst of response messages sent by interactive modules already deployed in the adaptive network, according to one embodiment of the present invention.

FIG. 7 illustrates a burst of response messages $M_{RSP1}$, $M_{RSP2}$, $M_{RSP3}$, $M_{RSP4}$ sent by a neighboring module 9-2 after receiving the burst of beacon messages $M_{BCN1}$, $M_{BCN2}$, $M_{BCN3}$, $M_{BCN4}$, according to one embodiment of the present invention. Transmitting the burst of response messages is advantageous because the new module 9-1 may determine the reliability of wireless link (e.g., the percentage of the response messages received successfully) from the neighboring module 9-2, 9-3, 9-4 to the new module 9-1. Line 710 represents the response messages $M_{RSP1}$, $M_{RSP2}$, $M_{RSP3}$, $M_{RSP4}$ transmitted by the neighboring module 9-2 and line 720 represents the response messages $M_{RSP1}$ received at the new module 9-1. In the example of FIG. 7, the new module 9-1 receives only the first response message $M_{RSP1}$ but not the other three subsequent beacon messages $M_{RSP2}$, $M_{RSP3}$, $M_{RSP4}$.

In the example of FIG. 7, the response message $M_{RSP}$ includes the following seven data fields: (i) Cmd02 field identifying the message as a response message, (ii) NopR field indicating the number of beacon messages received by the neighboring module 9-2, (iii) ID field indicating the network address of the neighboring module 9-2 within the adaptive network, (iv) RSSI_Avg field indicating the average of received radio signal strength as determined by the beacon messages received at the neighboring module 9-2, (v) LQI_Avg field indicating the average of the link quality indicator as determined by the beacon messages received at the neighboring module 9-2, (vi) Cost field representing a value or number indicative of the amount of energy required to transmit a message to a destination via the neighboring module 9-2, and (vii) Hops field representing forwarding transmission necessary before the message reaches the destination.

In one embodiment, the response message $M_{RSP}$ includes additional fields for computing the number of response messages successfully received at the new module 9-1. For that purpose, the response message $M_{RSP}$ may include NopT field indicating the number of response messages transmitted in the current burst of the response messages, and PN field indicating the sequence of the response message within the burst of the response messages. The new module 9-1 may determine from the NopT field and PN field in the response message, how many response messages are being transmitted in the burst, how many response messages the new module 9-1 failed to receive, and the percentage of the response messages successfully received.

In one embodiment, the beacon messages $M_{BCN}$ may be transmitted over different radio frequencies. The new module 9-1 may not know the radio channel used by the neighboring modules 9-2, 9-3, 9-4. In such case, the new module 9-1 may try different frequencies if no response message is received from the neighboring modules 9-2, 9-3, 9-4. The neighboring modules 9-2, 9-3, 9-4 may send the response messages when the beacon messages in the correct frequency is received from the new module 9-1. In another embodiment, the neighboring modules 9-2, 9-3, 9-4 may scan multiple frequency channels for the beacon messages, and transmit a response message to the new module 9-1 indicating the correct frequency for communicating in the established adaptive network.

While particular embodiments and applications have been illustrated and described, it is to be understood that the present invention is not limited to the precise construction and components disclosed herein and that various modifications, changes and variations may be made in the arrangement, operation and details of the method and apparatus of the present invention disclosed herein without departing from the spirit and scope of the invention as defined in the appended claims.

What is claimed is:

1. An interactive module for forming an adaptive wireless network in conjunction with other interactive modules communicating intermittently to conserve power, the interactive module comprising:

a transceiver unit for transmitting a burst of beacon messages after the interactive module is activated to discover a neighboring interactive module via which the interactive module can communicate with a destination, the beacon messages persisting for a first interval longer than a second interval during which neighboring interactive modules remain in a sleep mode of low-power expenditure, the transceiver unit receiving response messages from the neighboring interactive modules responsive to receiving the beacon messages;

a processor coupled to the transceiver unit for determining a selected neighboring interactive module via which to communicate with the destination based on the response messages from the neighboring interactive modules; and a transducer coupled to the transceiver unit for generating information representing a physical property sensed at the interactive module, the information transmitted via the transceiver unit, wherein each beacon message includes data having a plurality of data fields, the plurality of data fields including a first data field indicating that the beacon message is part of the transmitted burst of beacon messages, a second data field indicating a total number of beacon messages transmitted in the burst of beacon messages, and a third data field indicating a sequence of the beacon message within the burst of beacon messages.

2. The interactive module of claim 1, further comprising an indicator coupled to the processor for indicating discovery of a neighboring interactive module with which a reliable wireless link can be established.

3. The interactive module of claim 2, wherein the indicator is a tri-color light emitting diode (LED) displaying a first color indicating discovery of no neighboring interactive module with which a reliable wireless link can be established, a second color indicating discovery of one neighboring interactive module with which a reliable wireless link can be established, and a third color indicating discovery of two or more neighboring interactive modules with which reliable wireless links can be established.

4. The interactive module of claim 1, wherein the processor determines the selected neighboring interactive module based on some or all of the factors of (i) a percentage of the burst of the beacon messages received at the neighboring interactive module, (ii) a percentage of the response messages receive at the interactive module, (iii) a received signal strength indicator (RSSI) at the neighboring interactive module determined from the beacon messages received at the neighboring interactive modules, (iv) a received signal strength indicator (RSSI) at the interactive modules determined from the response messages received at the interactive module, (v) a link quality indicator (LQI) at the neighboring interactive modules determined from the beacon messages receive at the neighboring interactive modules, (vi) a link quality indicator (LQI) at the interview module determined from the response messages received at the interactive module, (vii) cost for transmitting a message from the interactive module to the destination via the neighboring interactive modules, and (viii) hops between the neighboring interactive modules and the destination.

5. The interactive module of claim 1, wherein the transceiver unit sends the beacon messages in multiple frequency channels and receives the response messages in multiple frequency channels.

6. The interactive module of claim 1, wherein the neighboring interactive modules do not relay the beacon messages to the destination or other interactive modules.

7. The interactive module of claim 1, wherein the response messages are transmitted in a burst of the response messages, and wherein each response message includes data having a plurality of data fields, the plurality of data fields including a first data field indicating that the response message is part of the transmitted burst of response messages, a second data field indicating a total number of response messages transmitted in the burst of response messages, and a third data field indicating a sequence of the response message within the burst of response messages.

8. A computer program product comprising a non-transitory computer readable storage medium structured to store instructions executable by a processor in an interactive module that forms an adaptive wireless network in conjunction with other interactive modules communicating intermittently to conserve power, the instructions, when executed cause the processor to:
 at a transceiver unit, transmit a burst of beacon messages after the interactive module is activated to discover a neighboring interactive module via which the interactive module can communicate with a destination, the beacon messages persisting for a first interval longer than a second interval during which neighboring interactive modules remain in a sleep mode of low-power expenditure;
 at the transceiver unit, receive response messages from the neighboring interactive modules responsive to receiving the beacon messages;
 determine a selected neighboring interactive module via which to communicate with the destination based on the response messages from the neighboring interactive modules; and
 generate and transmit information representing a physical property sensed at the interactive module to the selected neighboring interactive module,
 wherein each beacon message includes data having a plurality of data fields, the plurality of data fields including a first data field indicating that the beacon message is part of the transmitted burst of beacon messages, a second data field indicating a total number of beacon messages transmitted in the burst of beacon messages, and a third data field indicating a sequence of the beacon message within the burst of beacon messages.

9. The computer program product of claim 8, further comprising instructions causing the processor to control an indicator to indicate discovery of a neighboring interactive module with which the interactive module can establish a reliable wireless link.

10. The computer program of claim 9, wherein the indicator is a tri-color light emitting diode (LED), and the instructions causing the processor to control the indicator comprises:
 first instructions to display a first color at the tri-color light emitting diode (LED) indicating discovery of no neighboring interactive module with which a reliable wireless link can be established;
 second instructions to display a second color at the tri-color light emitting diode (LED) indicating discovery of one neighboring interactive module with which a reliable wireless link can be established; and
 third instructions to display a third color at the tri-color light emitting diode (LED) indicating discovery of two or more neighboring interactive modules with which reliable wireless links can be established.

11. The computer program product of claim 8, wherein the instructions to determine the selected neighboring interactive module determine some or all of the factors of (i) a percentage of the beacon messages received at the neighboring interactive modules, (ii) a percentage of the response messages receive at the interactive module, (iii) a received signal strength indicator (RSSI) at the neighboring interactive modules determined from the beacon messages receive at the neighboring interactive modules, (iv) a received signal strength indicator (RSSI) at the interactive modules determined from the response messages received at the interactive module, (v) a link quality indicator (LQI) at the neighboring interactive modules determined from the beacon messages receive at the neighboring interactive modules, (vi) a link quality indicator (LQI) at the interactive module determined from the response messages received at the interactive module, (vii) cost for transmitting a message from the interactive module to a destination via the neighboring interactive modules, and (vii) hops between the neighboring interactive modules and the destination.

12. The computer program product of claim 8, wherein the instructions to transmit the beacon messages control the receiver unit to transmit the beacon messages in multiple frequency channels, and the instructions to receive the response messages control the transceiver unit to receive the response messages in multiple frequency channels.

13. The computer program product of claim 8, wherein the response messages are transmitted in a burst of the response messages, and wherein each response message includes data having a plurality of data fields, the plurality of data fields including a first data field indicating that the response message is part of the transmitted burst of response messages, a second data field indicating a total number of response messages transmitted in the burst of response messages, and a third data field indicating a sequence of the response message within the burst of response messages.

14. An adaptive network including a plurality of interactive modules communicating intermittently to conserve power, the adaptive network comprising:
 a first interactive module after being activated operable to transmit a burst of beacon messages to discover a neighboring interactive module with which the interactive module can communicate, each beacon message persisting for a first interval longer than a second interval during which neighboring interactive modules are in a sleep mode of low-power expenditure; and
 a plurality of second interactive modules in an active mode subsequent to the sleep mode operable to receive the burst of beacon messages and to transmit response messages responsive to the beacon messages, the response messages being transmitted in a burst of the response messages, the response messages comprising data representing a first communication quality between the first interactive module and the second interactive modules as determined by the beacon messages received at the second interactive module, wherein the first interactive module determines a selected interactive module via which to communicate with a destination among the second interactive modules based on the response messages and a second communication quality between the first interactive module and the second interactive modules as determined by the response messages received at the first interactive module, and wherein each response message includes data having a plurality of data fields, the plurality of data fields including a first data field indicating that the response message is part of the transmitted burst of response messages, a second data field indicating a total number of response messages transmitted in the burst of response messages, and a third data field indicating a sequence of the response message within the burst of response messages.

15. The adaptive network of claim 14, wherein the plurality of data fields further include a fourth data field indicating a cost for the first interactive module to communicate with the destination via the second interactive modules.

16. The adaptive network of claim 15, wherein the plurality of data fields further include a fifth data field indicating hops between the second interactive modules and the destination.

17. The adaptive network of claim 14, wherein the first communication quality represents at least one of (i) a percentage of the beacon messages received at the second interactive modules, (ii) a received signal strength indicator (RSSI) as determined from the beacon messages receive at the second interactive modules, and (iii) a link quality indicator (LQI) as determined from the beacon messages receive at the second interactive modules.

18. The adaptive network of claim 14, wherein the second communication quality represents at least one of (i) a percentage of the response messages receive at the first interactive module, (ii) a received signal strength indicator (RSSI) as determined from the response messages received at the first interactive module, and (iii) a link quality indicator (LQI) as determined from the response messages received at the first interactive module.

19. The adaptive network of claim 14, wherein the first interactive module is operable to communicate with the second interactive modules via two or more frequency channels.

20. The adaptive network of claim 14, wherein each beacon message includes a preamble and data subsequent to the preamble, the preamble lasting at least for the second interval.

21. The adaptive network of claim 14, wherein each beacon message includes a repeat message that is repeated in the beacon message for at least the second interval.

22. The adaptive network of claim 14, wherein the plurality of data fields further include a fourth data field indicating a percentage of the beacon messages received at the second interactive modules, a fifth data field indicating communication quality as determined by the beacon messages received at the second interactive module, a sixth data field indicating cost of the first interactive module communicating to the destination via the second interactive module, and a seventh data field indicating hops between the second interactive modules and the destination.

23. The adaptive network of claim 14, wherein the second interactive module does not relay the beacon messages to the destination or other interactive modules.

24. An interactive module for forming an adaptive wireless network in conjunction with other interactive modules communicating intermittently to conserve power, the interactive module comprising:

a transceiver unit for transmitting a burst of beacon messages after the interactive module is activated to discover a neighboring interactive module via which the interactive module can communicate with a destination, the beacon messages persisting for a first interval longer than a second interval during which neighboring interactive modules remain in a sleep mode of low-power expenditure, the transceiver unit receiving response messages from the neighboring interactive modules responsive to receiving the beacon messages;

a processor coupled to the transceiver unit for determining a selected neighboring interactive module via which to communicate with the destination based on the response messages from the neighboring interactive modules; and a transducer coupled to the transceiver unit for generating information representing a physical property sensed at the interactive module, the information transmitted via the transceiver unit, wherein each beacon message comprises a repeat message that is repeated in the beacon message at least during the second interval, each repeat message including data having a plurality of data fields, the plurality of data fields including a first data field indicating that the beacon message is part of the transmitted burst of beacon messages, a second data field indicating a total number of beacon messages transmitted in the burst of beacon messages, and a third data field indicating a sequence of the beacon message within the burst of beacon messages.

25. A computer program product comprising a non-transitory computer readable storage medium structured to store instructions executable by a processor in an interactive module that forms an adaptive wireless network in conjunction with other interactive modules communicating intermittently to conserve power, the instructions, when executed cause the processor to:

at a transceiver unit, transmit a burst of beacon messages after the interactive module is activated to discover a neighboring interactive module via which the interactive module can communicate with a destination, the beacon messages persisting for a first interval longer than a second interval during which neighboring interactive modules remain in a sleep mode of low-power expenditure;

at the transceiver unit, receive response messages from the neighboring interactive modules responsive to receiving the beacon messages;

determine a selected neighboring interactive module via which to communicate with the destination based on the response messages from the neighboring interactive modules; and generate and transmit information representing a physical property sensed at the interactive module to the selected neighboring interactive module, wherein each beacon message includes a repeat message that is repeated in the beacon message at least during the second interval, each repeat message including data having a plurality of data fields, the plurality of data fields including a first data field indicating that the beacon message is part of the transmitted burst of beacon messages, a second data field indicating a total number of beacon messages transmitted in the burst of beacon messages, and a third data field indicating a sequence of the beacon message within the burst of beacon messages.

* * * * *